(12) United States Patent
Webb et al.

(10) Patent No.: US 10,165,550 B2
(45) Date of Patent: Dec. 25, 2018

(54) UPLINK CHANNEL FOR WIRELESS COMMUNICATION

(71) Applicant: FUJITSU LIMITED, Kawasaki-shi, Kanagawa (JP)

(72) Inventors: Matthew Webb, London (GB); Milos Tesanovic, Harrow (GB); Timothy Moulsley, Caterham (GB); Yiwei Fang, High Wycombe (GB)

(73) Assignee: FUJITSU LIMITED, Kawasaki (JP)

( * ) Notice: Subject to any disclaimer, the term of this patent is extended or adjusted under 35 U.S.C. 154(b) by 322 days.

(21) Appl. No.: 14/254,426

(22) Filed: Apr. 16, 2014

(65) Prior Publication Data
US 2014/0233528 A1 Aug. 21, 2014

Related U.S. Application Data

(63) Continuation of application No. PCT/EP2012/051144, filed on Jan. 25, 2012.

(51) Int. Cl.
*H04W 72/04* (2009.01)
*H04L 5/00* (2006.01)

(52) U.S. Cl.
CPC .......... *H04W 72/04* (2013.01); *H04L 5/0094* (2013.01)

(58) Field of Classification Search
None
See application file for complete search history.

(56) References Cited

U.S. PATENT DOCUMENTS

| 7,061,890 | B2 | 6/2006 | Kim et al. |
| 2009/0088175 | A1 | 4/2009 | Pelletier et al. |
| 2011/0096748 | A1 | 4/2011 | Meyer et al. |
| 2011/0250913 | A1 | 10/2011 | Vajapeyam et al. |

(Continued)

FOREIGN PATENT DOCUMENTS

| EP | 2560448 A1 | 2/2013 |
| JP | 2010-541411 A | 12/2010 |

(Continued)

OTHER PUBLICATIONS

International search report issued for corresponding international application No. PCT/EP2012/051144, dated Nov. 6, 2012.

(Continued)

*Primary Examiner* — Hassan Kizou
*Assistant Examiner* — Hector Reyes Ortiz
(74) *Attorney, Agent, or Firm* — Myers Wolin, LLC

(57) ABSTRACT

A transmission procedure for use in a communication system including a base station and one or more terminals. The base station transmits a signal to a terminal, and provides the terminal with possible characteristics of a further signal for transmission from the terminal to the base station, the possible characteristics including at least one of: one or more locations for transmission of the further signal in the time domain; and one or more locations for the transmission of the further signal in the frequency domain; and wherein transmission of the further signal from the terminal, with one or more characteristics selected by the terminal from the possible characteristics, indicates further information relating to the terminal.

17 Claims, 6 Drawing Sheets

510
partition the preambles
|
520
UE selects preamble from a partition to signify information
|
530
UE transmits selected preamble
|
540
eNodeB detects preamble, infers information about UE based on partition to which preamble belongs

(56) References Cited

U.S. PATENT DOCUMENTS

| | | | | |
|---|---|---|---|---|
| 2013/0343323 A1* | 12/2013 | Kang | .................... | H04W 72/04 370/329 |
| 2014/0071930 A1* | 3/2014 | Lee | .................. | H04W 74/0833 370/329 |
| 2014/0079011 A1* | 3/2014 | Wiberg | ............... | H04W 74/006 370/329 |
| 2014/0112286 A1* | 4/2014 | Ahn | .................... | H04W 74/002 370/329 |
| 2014/0177525 A1* | 6/2014 | Aydin | ................... | H04W 4/005 370/328 |

FOREIGN PATENT DOCUMENTS

| | | |
|---|---|---|
| WO | 2009/042845 A2 | 4/2009 |
| WO | 2010087570 A1 | 8/2010 |
| WO | 2011100596 A2 | 8/2011 |
| WO | 2011111016 A1 | 9/2011 |
| WO | 2013044970 A1 | 4/2013 |

OTHER PUBLICATIONS

ETSI TS 136 211 V8.7.0; Evolved Universal Terrestrial Radio Access (E-UTRA); "Physical channels and modulation (3GPP TS 36.211 version 8.7.0 Release 8)"; Jun. 2009.

ETSI TS 136 300 V8.12.0; LTE; Evolved Universal Terrestrial Radio Access (E-UTRA) and Evolved Universal Terrestrial Radio Access Network (E-UTRAN); "Overall description; Stage 2 (3GPP TS 36.300 version 8.12.0 Release 8)"; Apr. 2010.

Huawei; "Non-synchronized Random Access Procedure"; Agenda Item: 4.1; 3GPP TSG RAN WG1 LTE Ad Hoc; R1-061856; Cannes, France; Jun. 27-30, 2006.

CATT; "Valid PRACH resource for dedicated preamble"; Agenda Item: 5.1.1.6; 3GPP TSG RAN WG2 #61bis; R2-081672; Shenzhen, China; Mar. 31-Apr. 4, 2008.

Alcatel-Lucent, Alcatel Lucent Shanghai Bell; "Layer 1 indication of UE capability and preference for Enhanced CELL_FACH"; Agenda Item: 10.1.9; 3GPP TSG-RAN WG2 Meeting #76; R2-115868; San Francisco, USA; Nov. 14-18, 2011.

Notice of Reason(s) for Rejection issued for corresponding Japanese Patent Application No. 2014-553623 dated Oct. 6, 2015 with an English translation.

Nokia Siemens Networks, "Fallback to R99 RACH", Agenda Item: 10.1.4, R2-116315, 3GPP TSG-RAN WG2 Meeting #76, San Francisco, CA (US), Nov. 14-18, 2011.

* cited by examiner

UPLINK CHANNEL FOR WIRELESS COMMUNICATION

CROSS-REFERENCE TO RELATED APPLICATIONS

This is a continuation of International Application No. PCT/EP2012/051144, filed on Jan. 25, 2012, now pending, the contents of which are herein wholly incorporated by reference.

FIELD OF THE INVENTION

The present invention relates to a transmission method in a wireless communication system comprising a base station and terminals for transmitting transmission data to the base station. The present invention further relates to a terminal, to a base station and a computer program for use in said method.

Particularly, but not exclusively, the present invention relates to uplink communication procedures in accordance with the LTE (Long Term Evolution) and LTE-Advanced radio technology standards as, for example, described in the 3GPP TS36 series specifications, releases 9, 10 and subsequent of the 3GPP specification series. However, the present invention is also applicable to UMTS, WiMAX and other communication systems in which radio resource allocation requests are communicated from a terminal (also referred to as "subscriber station", "user equipment" or UE, "mobile terminal" etc.) to a base station.

BACKGROUND OF THE INVENTION

Wireless communication systems are widely known in which base stations (BSs) form "cells" and communicate with terminals within range of the BSs. In LTE for example, the base stations are generally called eNodeBs or eNBs and the terminals are called user equipments or UEs. At is simplest, the arrangement is as shown in FIG. 2A with a UE 10 in communication with a single eNodeB 20. In practice, as will be understood by those skilled in the art, the eNodeB 20 is able to maintain communications with many UEs 10 simultaneously.

The direction of communication from the base station to the UE, indicated by an arrow in FIG. 2A, is referred to as the downlink (DL), and the reverse direction from the UE to the base station is the uplink (UL). Two well-known transmission modes for a wireless communication system are TDD (Time Division Duplex), in which downlink and uplink transmissions occur on the same carrier frequency and are separated in time, and FDD (Frequency Division Duplex) in which transmission occurs simultaneously on DL and UL using different carrier frequencies.

In such a system, each BS divides its available frequency and time resources in a given cell, into individual resource allocations for the user equipments which it serves. The user equipments are generally mobile and therefore may move among the cells, prompting a need for handovers of radio communication links between the base stations of adjacent cells. A user equipment may be in range of (i.e. able to detect signals from) several cells at the same time, but in the simplest case it communicates with one "serving" or "primary" cell. A wireless communication system, and the cells within it, may be operated in FDD (Frequency Division Duplex) or TDD (Time Division Duplex) mode.

Resources in the system have both a frequency dimension, divided in units of subcarriers, and a time dimension having units of a symbol time or "slot" (where a "slot" has typically a duration of seven symbol times), as indicated in FIG. 1A. The resources in the time domain are further organised in units of frames, each having a plurality of "subframes". In one frame structure for LTE, the 10 ms frame is divided into 20 equally sized slots of 0.5 ms as illustrated in FIG. 1B. A sub-frame consists of two consecutive slots, so one radio frame contains 10 sub-frames. An FDD frame consists of 10 uplink subframes and 10 downlink subframes occurring simultaneously. In TDD, various allocations of subframes to downlink and uplink are possible, depending on the load conditions. Subframes may consequently be referred to as uplink subframes or downlink subframes.

The UEs are allocated, by a scheduling function at the eNodeB, a specific number of subcarriers for a predetermined amount of time. Such allocations typically apply to each subframe. Resources are allocated to UEs both for downlink and uplink transmission (i.e. for both downlink subframes and uplink subframes).

The transmitted signal in each slot is described by a resource grid of sub-carriers and available OFDM symbols, as shown in FIG. 1A. Each element in the resource grid is called a resource element (RE) and each resource element corresponds to one symbol. An amount of resource consisting of a set number of subcarriers and OFDM symbols is referred to as a resource block (RB) in LTE, as indicated by the bold outline in FIG. 1A.

The uplink in an LTE wireless communication system employs a variant of OFDMA called Single-Carrier FDMA (SC-FDMA). Essentially, SC-FDMA is a linearly precoded OFDMA scheme, involving an additional DFT step before OFDMA processing. Access to the uplink by multiple UEs is enabled by assigning to each UE a distinct set of non-overlapping sub-carriers. Hereby incorporated by reference is also 3GPP TS 36.300 providing an overall description of the radio interface protocol architecture used in LTE-based systems and in particular section 5.2 of 3GPP TS 36.300 relating to uplink transmission schemes.

In LTE, several channels for data and control signalling are defined at various levels of abstraction within the system.

FIG. 2B shows some of the uplink channels defined in LTE at each of a logical level, transport layer level and physical layer level, and the mappings between them. User data and also some signalling data is carried on a Physical Uplink Shared Channel (PUSCH). By means of frequency hopping on PUSCH, frequency diversity effects can be exploited and interference averaged out. The control channels include a Physical Uplink Control Channel, PUCCH, used to carry signalling from UEs including channel state information (CSI), as represented for example by channel quality indication (CQI) reports, and scheduling requests (SR). Of particular interest for present purposes, there is also a Physical Random Access Control Channel, PRACH with at the transport layer level, a corresponding Random Access Channel, RACH. In addition to the above channels, uplink resources are also allocated to reference signals, in particular a Sounding Reference Signal SRS.

Meanwhile, on the downlink (not illustrated), user data and higher layer signalling (e.g. for radio resource control (RRC)) is carried on the Physical Downlink Shared Channel (PDSCH). Other control channel signalling (e.g. for radio resource allocation) is carried by the Physical Downlink Control Channel, PDCCH. Downlink signalling includes System Information (SI) which consists of cell- and network-specific parameters needed by UEs to connect to the network. SI is divided into SI blocks (SIBs) each containing a set of related parameters.

The Physical Random Access Channel PRACH is used to carry the Random Access Channel (RACH) for accessing the network if the UE does not have any allocated uplink transmission resource. If a scheduling request (SR) is triggered at the UE, for example by arrival of data for transmission on PUSCH, when no PUSCH resources have been allocated to the UE, the SR is transmitted on a dedicated resource for this purpose. If no such resources have been allocated to the UE, the RACH procedure is initiated. The transmission of SR is effectively a request for uplink radio resource on the PUSCH for data transmission.

Thus, RACH is provided to enable UEs to transmit signals in the uplink without having any dedicated resources available, such that more than one terminal can transmit in the same PRACH resources simultaneously. The term "Random Access" (RA) is used because (except in the case of contention-free RACH, described below) the identity of the UE (or UEs) using the resources at any given time is not known in advance by the network (incidentally, in this specification the terms "system" and "network" are used interchangeably). Preambles (which when transmitted, produce a signal with a signatures which can be identified by the eNodeB) are employed by the UEs to allow the eNodeB to distinguish between different sources of transmission.

RACH can be used by the UEs in either of contention-based and contention-free modes.

In contention-based RA, UEs select any preamble at random, at the risk of "collision" at the eNodeB if two or more UEs accidentally select the same preamble. Contention-free RA avoids collision by the eNodeB informing each UE which preambles may be used.

Referring to FIG. 3, the Physical Random Access Channel PRACH typically operates as follows (for contention based access):—
(i) The UE 10 receives the downlink broadcast channel for the cell of interest (serving cell).
(ii) The network, represented in FIG. 3 by eNodeB 20, indicates cell specific information including the following:
resources available for PRACH
preambles available (up to 64)
preambles corresponding to small and large message sizes.
(iii) The UE selects a PRACH preamble according to those available for contention based access and the intended message size.
(iv) The UE 10 transmits the PRACH preamble (also called "Message 1", indicated by (1) in the Figure) on the uplink of the serving cell. The network (more particularly the eNodeB of the serving cell) receives Message 1 and estimates the transmission timing of the UE.
(v) The UE 10 monitors a specified downlink channel for a response from the network (in other words from the eNodeB). In response to the UE's transmission of Message 1, the UE 10 receives a Random Access Response or RAR ("Message 2" indicated by (2) in FIG. 3) from the network. This contains an UL grant for transmission on PUSCH and a Timing Advance (TA) command for the UE to adjust its transmission timing.
(vi) In response to receiving Message 2 from the network, the UE 10 transmits on PUSCH ("Message 3", shown at (3) in the Figure) using the UL grant and TA information contained in Message 2.
(vii) As indicated at (4), a contention resolution message may be sent from the network (in this case from eNodeB 20) in the event that the eNodeB 20 received the same preamble simultaneously from more than one UE, and more than one of these UEs transmitted Message 3.

If the UE does not receive any response from the eNodeB, the UE selects a new preamble and sends a new transmission in a RACH subframe after a random back-off time.

For contention-free RA, the procedure is simpler:
(i) The eNodeB configures the UE with a preamble from those available for contention-free access.
(ii) The UE transmits the preamble (Message 1) on the uplink of the serving cell.
(iii) The UE receives the RAR (Message 2) from the network, which contains an UL grant for transmission on PUSCH.

In both contention-based and contention-free RACH procedures, the RAR contains a Cell Radio Network Temporary Identifier (C-RNTI) which identifies the UE. In the contention-based procedure, the UE transmits this C-RNTI back to the eNodeB in Message 3 and, if more than one UE does so there will be a collision at the eNodeB which may then initiate the contention resolution procedure.

Situations where the RACH process is used include:
Initial access from RRC_IDLE
RRC connection re-establishment
Handover
DL data arrival in RRC_CONNECTED (when non-synchronised)
UL data arrival in RRC_CONNECTED (when non-synchronised, or no SR resources are available)
Positioning (based on Timing Advance)

The RACH procedure can be triggered in response to a PDCCH order (e.g. for DL data arrival, or positioning). Contention free RA is only applicable for handover, DL data arrival and positioning.

FIG. 4 illustrates the format of a PRACH preamble message in LTE. As shown, the message (here denoted by 30) consists of a cyclic prefix CP 31, the preamble sequence 32 itself, and (not illustrated here) a guard interval to allow for differences in arrival timings at the eNodeB. The CP has a duration $T_{CP}$ 33 and the sequence 32 has a duration $T_{SEQ}$ 34. Note that there is no room in the conventional PRACH preamble for additional information.

Given the PRACH preamble format specified in LTE as shown in FIG. 4, the UE can only indicate limited control information with RACH Message 1. If it were possible to convey more information early in the RACH procedure, system performance could be improved. For example, delay could be reduced between initiation of the RACH procedure and start of data transmission with maximum data rate or spectral efficiency.

In LTE, the preambles transmitted by the UEs are designed to be received at the network using correlation techniques, with typically one correlator per sequence. Directly increasing the information content of a preamble by increasing the number of preambles available would impose a significant increase in complexity in the eNodeB. Therefore a different solution is needed.

Meanwhile, the advent of machine-type communications (MTC) between e.g. smart meters in homes and an LTE network creates a large number of deployed devices which must be low cost, low power, are generally deployed statically and have low-rate, possibly periodic data transmissions with potentially long gaps.

It is therefore desirable to reduce the power required to run such devices to a level significantly below that of even low-category UEs as currently specified. One way to do this is to design signalling which is more efficient than existing LTE signalling by being targeted at the MTC-device scenario. The LTE RA procedure has the following problems in such a scenario:

The contention-based RA procedure must be used in most cases. This can result in repeated need to transmit on PRACH even though in the case of MTC devices their access requirements may be tolerant to delay and have a meaningfully non-random pattern to them.

There can be significant numbers of MTC devices within the coverage of a single cell, but there are only 64 preambles available in a given cell at a given time. Certain events can trigger many of the devices to have UL data to transmit simultaneously, resulting in many RACH collisions and wasted transmissions by UEs on PRACH. It is desirable to reduce these for low-cost, low-power devices.

The RA procedure must be used whenever a UE is not uplink-synchronised, or has become unsynchronised (e.g. due to UE clock drift), a potentially frequent occurrence in transmission profiles with long silent periods and low-cost devices typical in some MTC-device scenarios.

The network has little capability to distinguish between device types early in the LTE random access procedure, so it cannot necessarily respond appropriately to each type of the mix of devices it is serving.

Little information can be exchanged between eNodeB and UE in the RA procedure, thus making poor use of the limited transmission power available in low-cost devices.

SUMMARY OF THE INVENTION

According to a first aspect of the present invention, there is provided a transmission method for use in a communication system comprising a base station and one or more terminals, the method involving the base station transmitting a signal to a terminal, and providing the terminal with possible characteristics of a further signal for transmission from the terminal to the base station, the possible characteristics including at least one of:
  one or more locations for transmission of the further signal in the time domain; and
  one or more locations for the transmission of the further signal in the frequency domain; and wherein
    transmission of the further signal from the terminal, with characteristics selected by the terminal from the possible characteristics, indicates further information relating to the terminal.

Here, "characteristics" can include, but are not limited to, resource allocations for transmission of the signal. Thus, "locations" in the time domain can include specific timings within a subframe, and/or specific subframes within a frame or sequence of frames. Locations in the frequency domain can include specific frequency allocations (e.g. sets of subcarriers). "Possible characteristics" can refer to a set or range of allocations from which the terminal may choose, or to the fact that the terminal may or may not decide to use the transmission opportunity provided by a resource allocation assigned to it.

The step of providing the terminal with one or more possible characteristics of the further signal (e.g., assigning resources for transmission of the further signal) may be performed by, or at least comprise, the base station transmitting the signal to the terminal.

The further signal, for transmission by the terminal, may be a preamble for transmission in a random access procedure. In this case, possible characteristics may include a specific selection of preamble, or of a subset (partition) of preambles from among those defined in the system.

Alternatively, or in addition, the further signal may comprise a scheduling request, and the one or more possible characteristics including characteristics of resources to be used for the scheduling request.

The transmission of the further signal from the terminal may be preceded by a random access procedure. A preamble employed by the terminal in this random access procedure may be chosen by the terminal to signify information about the further signal, or to signify that a sequence of further signals will be transmitted from the terminal. For example, any one or more of a transmission on PUSCH, a buffer status report BSR, a channel state information report CSI, a scheduling request SR, and a sounding reference signal SRS may be signified in this way.

It is not essential for the step of providing the terminal with one or more possible characteristics of the further signal to be performed by the base station. This may be achieved without involving signalling from the base station, for example at a time of installing the terminal.

Although the one or more possible characteristics, for use by the terminal in transmitting the further signal, may be applicable indefinitely, they may alternatively apply to the terminal for a limited time. This may be achieved by the base station signalling a timer to the terminal, or asserting a flag at RRC level to indicate expiry of the assignment.

The one or more locations for transmission of the further signal in the time domain may include subframes within which transmission of the further signal is permitted. In this way, terminals (MTC devices for example) not needing to transmit in every subframe, may be assigned specific subframes for transmitting the further signal, allowing the same resources to be assigned to other devices in the remaining subframes.

Certain embodiments of the present invention employ the principle of partitioning the set of possible preambles in order to allow the further information to be signified by the choice of partition. In this way, when the set of preambles defined in the system is divided into two or more partitions, the transmission of the preamble from the terminal can indicate the further information relating to the terminal by virtue of the partition to which the preamble belongs.

Various kinds of further information may be conveyed using this principle. In the case of further information relating to the terminal, this can include at least one of:
  category of the terminal;
  bandwidth capability of the terminal;
  buffer status of the terminal; and
  traffic profile expected by the terminal.

In the case of further information relating to the base station or system, this can include at least one of:
  a bandwidth capability indication of the base station; and
  system information.

One embodiment conveys the further information by the combination of characteristics of two signals, one from the terminal and the other from the base station. In particular, where the random access procedure comprises for example a contention-based random access followed by a contention-free random access, the further information relating to the base station or system can be indicated by a combination of characteristics of a preamble transmitted from the terminal for contention-based random access and the possible characteristics of the further signal as provided by the base station, the further signal being a preamble for contention-free random access.

According to a second aspect of the present invention, there is provided a wireless communication system operated in accordance with any of the methods defined above. The system, to which the method is applied, may be an LTE-based system.

According to a third aspect of the present invention, there is provided a terminal for use in any of the methods as defined above and configured for transmission of the further signal with at least one of the one or more possible characteristics in such a manner as to indicate further information relating to the terminal.

According to a fourth aspect of the present invention, there is provided a base station for use in any of the methods defined above and configured for transmission of the signal thereby providing the terminal with the one or more possible characteristics and in such a manner as to indicate to the terminal further information relating to the base station or system.

According to a fifth aspect of the present invention, there is provided computer-readable instructions which, when executed by a processor of a transceiver device in a wireless communication system, cause the device to provide the terminal or the base station as defined above. Such instructions may be stored on one or more computer-readable media.

A further aspect of the present invention provides a transmission method for use in a wireless communication system comprising a base station and one or more terminals wherein the base station transmits a signal to a terminal which indicates to the terminal one or more possible characteristics of a further signal for transmission from the terminal to the base station, wherein the one or more possible characteristics include at least one of:
one or more locations for transmission of the further signal in the frequency domain; and
one or more locations for the transmission of the further signal in the time domain; wherein the one or more possible characteristics indicate to the terminal further information relating to the base station or system.

In a preferred embodiment of this aspect, the one or more possible characteristics are a subset of the available preambles for random access by the terminal. The base station partitions the available preambles and informs the terminal of a partition selected in such a way as to signify some information about the base station.

Thus, preferably, the further signal comprises a preamble for transmission in a random access procedure and the possible characteristics further include a preamble to be used by the terminal; and a set of possible preambles is defined in the system and divided into two or more partitions, the transmission of the signal from the base station to the terminal indicating the further information relating to the base station or system by virtue of the partition to which the preamble, to be used by the terminal, belongs.

In this aspect, preferably, the further information relating to the base station or system comprises at least one of:
a bandwidth capability indication of the base station;
system information;
TDD/FDD capability of the base station; and
availability of other frequency bands or alternative radio technologies.

The random access procedure just mentioned may comprise a contention-based random access followed by a contention-free random access, in which case the further information relating to the base station or system is indicated by a combination of characteristics of a preamble transmitted from the terminal for contention-based random access, and the possible characteristics of the further signal as provided by the base station, the further signal being a preamble for contention-free random access.

The above further aspect may be combined with any of the features of the method of the first aspect and its preferable features as applicable.

Another aspect of the present invention provides a wireless communication system comprising a base station and one or more terminals, the base station arranged to transmit a signal to a terminal, and the system arranged to provide the terminal with possible characteristics of a further signal for transmission from the terminal to the base station, the possible characteristics including at least one of:
one or more locations for transmission of the further signal in the time domain; and
one or more locations for the transmission of the further signal in the frequency domain; and wherein transmission of the further signal from the terminal with characteristics selected by the terminal from the possible characteristics indicates further information relating to the terminal.

A still further aspect of the present invention provides a wireless communication system comprising a base station and one or more terminals, wherein the base station is arranged to transmit a signal to a terminal which indicates to the terminal one or more possible characteristics of a further signal for transmission from the terminal to the base station, wherein the one or more possible characteristics include at least one of:
one or more locations for transmission of the further signal in the frequency domain; and
one or more locations for the transmission of the further signal in the time domain; wherein the one or more possible characteristics indicate to the terminal further information relating to the base station or system.

In general, and unless there is a clear intention to the contrary, features described with respect to one aspect of the invention may be applied equally and in any combination to any other aspect, even if such a combination is not explicitly mentioned or described herein.

As is evident from the foregoing, the present invention involves signal transmissions between a base station and at least one terminal in a wireless communication network (wireless communication system). The "terminal" referred to here may take any form suitable for transmitting and receiving such signals. For the purpose of visualising the invention, it may be convenient to imagine the terminal as a mobile handset but no limitation whatsoever is to be implied from this. In preferred embodiments of the present invention the base stations will typically take the form proposed for implementation in the 3GPP LTE and 3GPP LTE-A groups of standards, and may therefore be described as an eNodeB (eNB) (which term also embraces Home eNodeB or HeNB) as appropriate in different situations. However, subject to the functional requirements of the invention, some or all base stations may take any other form suitable for transmitting and receiving signals to and from terminals.

BRIEF DESCRIPTION OF THE DRAWINGS

Reference is made, by way of example only, to the accompanying drawings in which.

DETAILED DESCRIPTION

Figure 1A:
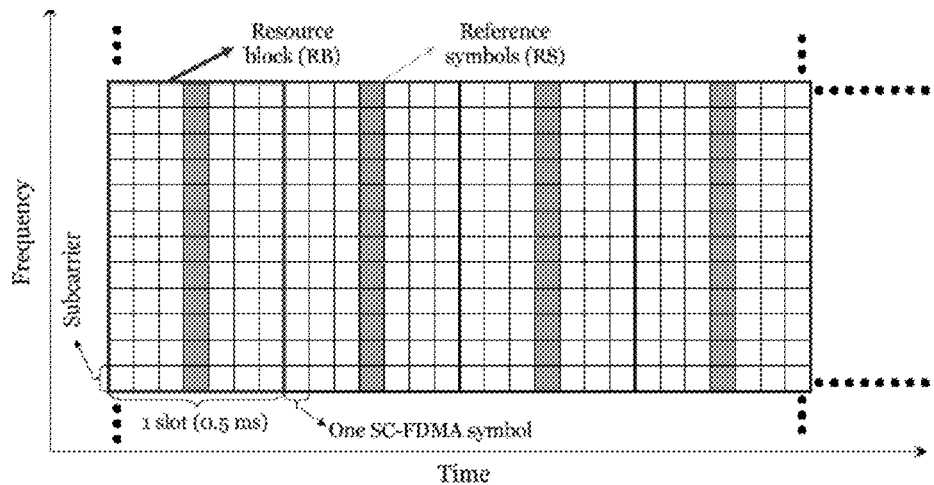
FIG. 1A illustrates a resource block (RB) on the uplink of an LTE wireless communication system.
Figure 1B:
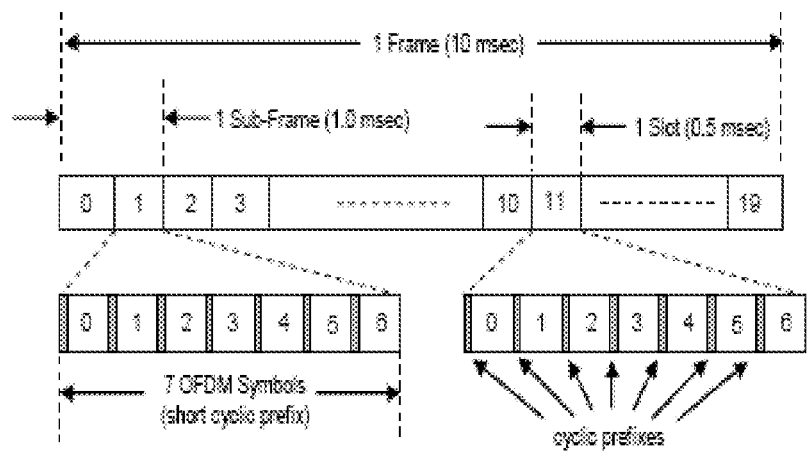
FIG. 1B illustrates frames and subframes in an LTE wireless communication system.
Figure 2A:
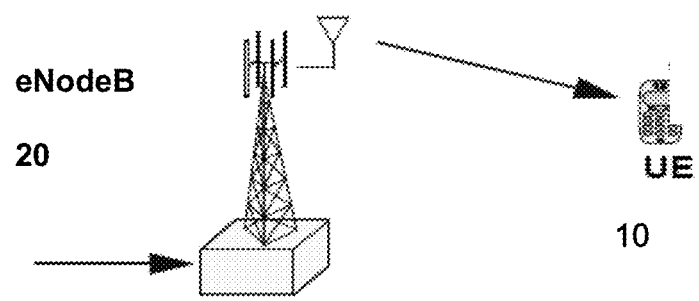
FIG. 2A shows a terminal (UE) in wireless communication with a base station (eNodeB)
Figure 2B:
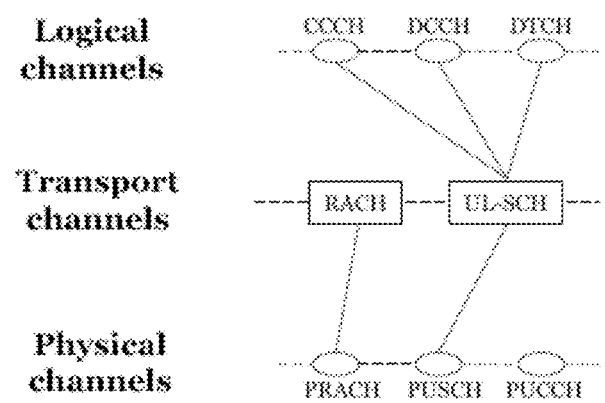
FIG. 2B shows relationships between various uplink channels defined in LTE.

Embodiments of the present invention provide enhancements to the RA procedure and other relevant UL and DL signalling so that it is designed to aid identification of MTC-style scenarios, and is thus able to reduce power consumption, enable appropriate prioritization by the network, reduce signalling overhead, and make more efficient use of transmitted PRACH signals.

More specifically, embodiments of the present invention provide a scheme in which, following an initial conventional contention-based RA procedure, needed to enter the RRC_CONNECTED state from idle mode, some UEs (which term is to be understood as including MTC devices) are allocated specific PRACH resources in time (and possibly frequency) and particular RA preambles for use in future RA procedures. This eliminates further contention among such UEs, removes wasted PRACH transmissions and extends the time-multiplexing of the limited number of RA preambles to be in specific, (semi-) permanent subframes for specific UEs. This is done by associating the UE's identity to the resources in which its fixed preamble may appear, allowing the eNodeB to discard any such fixed-resource preambles appearing in resources to which they were not assigned.

Other contention-free preambles from UEs not participating in this procedure are unaffected. It is preferable that UEs which have the capability to use the above scheme, and are configured to do so, have knowledge of the set of preambles that are available for the scheme, and those preambles which are not. UEs which do not have the capability to use the proposed scheme should have knowledge of the preambles from which they may select for their own conventional contention-based RA, in order to avoid conflict.

This new RA procedure will not be suitable for all LTE devices, so further embodiments of the present invention provide means for the UE to transmit additional information implicitly in the RA procedure. In these further embodiments, the set of preambles (up to 64) are partitioned into as many partitions as states which the information the UE wishes to indicate may take (for example two, in the case of whether or not the UE is suitable for the new RA procedure). The UE then indicates this state by accessing PRACH with a preamble selected from the appropriate partition, rather than a preamble selected at random. In this way the UE may indirectly signal information implicitly by the choice of partition, rather than explicitly by a separate signal. The eNodeB may similarly indicate information back to the UE by its selection of preamble and/or resource for the UE's RA.

Although the proposed scheme is intended for MTC in LTE, it is not limited to such applications.

Unless otherwise indicated, the embodiments described below are described in the context of LTE by way of example, where the wireless communication system (also referred to as the "network") operates using FDD and comprises one or more base stations (also referred to as "eNodeBs" or "eNBs"), each controlling one or more downlink cells, each downlink (DL) cell having a corresponding uplink cell. Each DL cell may serve one or more terminals (also referred to as "UEs") which may receive and decode signals transmitted in that serving cell. In order to control the use of transmission resources in time, frequency and spatial domains for transmission to and from the UEs, the eNodeB sends control channel messages (PDCCH) to the UEs. A PDCCH message typically indicates whether the data transmission will be in the uplink (using PUSCH) or downlink (using PDSCH), it also indicates the transmission resources, and other information such as transmission mode, number of antenna ports, data rate, number of codewords enabled. In addition PDCCH may indicate which reference signals may be used to derive phase reference(s) for demodulation of a DL transmission. Reference signals for different antenna ports, but occupying the same locations, are distinguished by different spreading codes.

Figure 3:
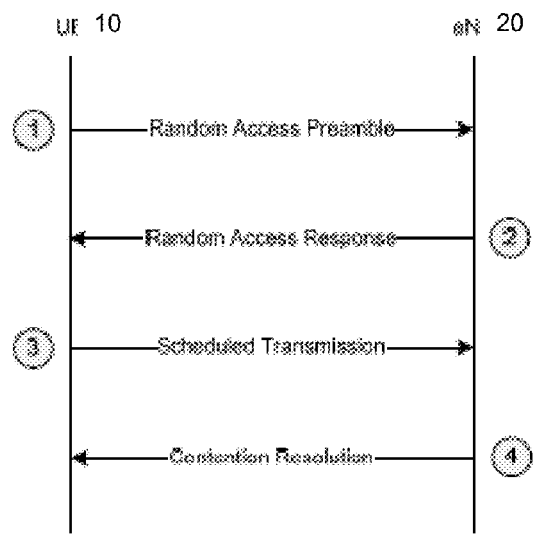
FIG. 3 shows a contention-based RACH procedure in LTE.
Figure 4:
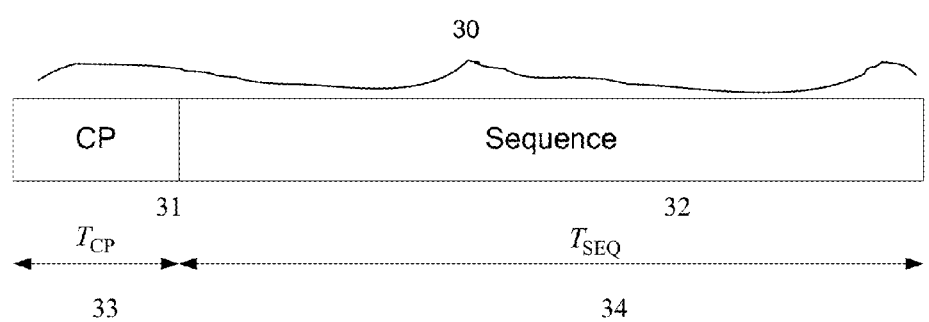
FIG. 4 shows the format of a PRACH preamble.

Initial access to the system by a UE is carried out using the contention-based RA procedure (as already described with respect to FIG. 3), where the UE transmits a RA preamble chosen from the 64 available (in some embodiments of the invention, there are restrictions on this as will be explained). The case where UE may be configured to have two or more serving cells at the same carrier frequency is not excluded. In this case usually two or more sets of PRACH resources would be defined by the UE performing a distinct RA procedure in each cell. There need not be any particular relationship between the PRACH resources in the cells.

Some specific embodiments of the present invention will now be described by way of example.

First Embodiment: Expanded Contention-Free RACH for UE Identification

Figure 5:
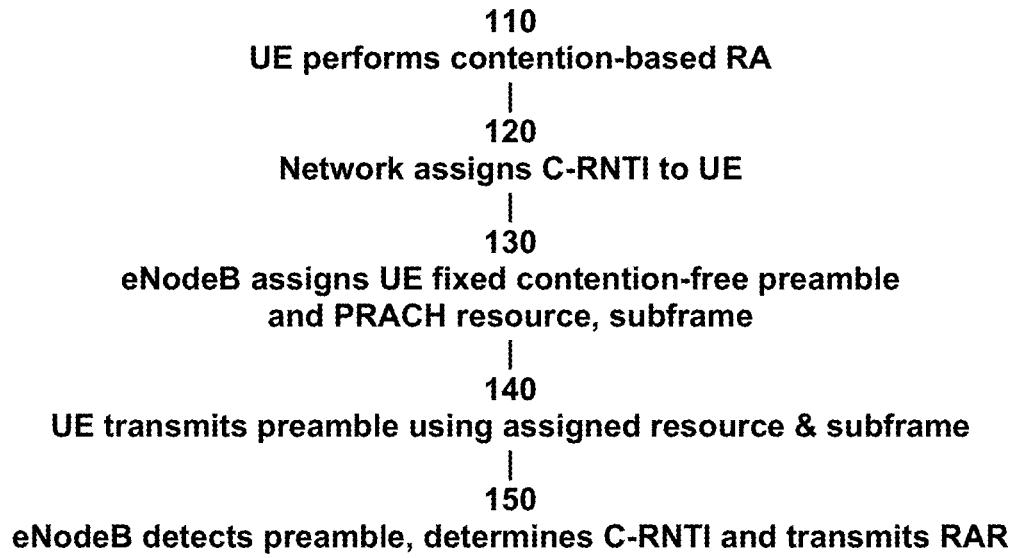
FIG. 5 is a flowchart of the first embodiment of the present invention.

FIG. 5 shows, in simplified form, the sequence of steps in the first embodiment of the present invention. In the first embodiment, a low-cost LTE device wishes to obtain contention-free RA resources on a long-term basis for low-rate or periodical data transmissions. In an initial step 110, a UE known by the eNodeB to have this characteristic (see following embodiments) performs a conventional contention-based RA procedure using a preamble which may be chosen at random in the usual manner. The UE eventually obtains a C-RNTI (step 120). Following this, the network records a mapping of this C-RNTI to a literal identifier unique to the UE, e.g. its MSISDN.

The eNodeB then (step 130) configures the UE with a fixed contention-free RA preamble and further grants the UE fixed subframes and PRACH resources in the time domain, in which it may transmit its preamble on PRACH. One or more of the uplink subframes may be assigned to each UE. Since the preambles are orthogonal, up to 64 UEs may be assigned to each PRACH resource within a given subframe. Different UEs may be granted uplink subframes at different periodicities (subframe intervals). The eNodeB records the association of preamble+PRACH resource+subframes to C-RNTI. Preferably the preamble and resource will be available to the UE until revoked by the eNodeB.

Thus, after once performing the conventional contention-based RA, the UE obtains an assigned contention-free preamble and resources for the transmission of the same, for its future use. At some later time the UE transmits the assigned preamble (step 140), using the assigned time resource, and in the subframe assigned to it by the eNodeB. On detecting a preamble (step 150) in a subframe for which the relevant UE has been granted PRACH access, the eNodeB determines to which C-RNTI it corresponds, and then to which literal UE identifier it corresponds, and is then able to provide a suitable RAR.

If the eNodeB detects a preamble assigned to a UE known to be following this procedure in a subframe or PRACH resources which has not been configured, the transmission is ignored. (Other contention-free preambles from UEs not participating in this procedure are unaffected).

Above, the UE is assigned PRACH time resources, and in the frequency domain the UE may use the full PRACH bandwidth. In a variation of this embodiment, the UE is further assigned specific uplink PRACH frequency resources in which it may transmit its preamble on PRACH. Such frequency assignment may be a subset of the usual PRACH frequency resources, or some different resources in the frequency domain. Up to 64 UEs may be accommodated in each PRACH time-frequency resource allocation.

The combination of preamble assignment along with time and (optionally) frequency locations for its transmission, is referred to below as "preamble+resource".

Second Embodiment: Scheduling Request (SR) Grants

In a second embodiment (FIG. 6), the principle of UE configuration as in the first embodiment is used alternatively or additionally to provide the UE with dedicated PUCCH resources and one or more uplink subframes in which it may transmit a scheduling request (SR).

Figure 6:
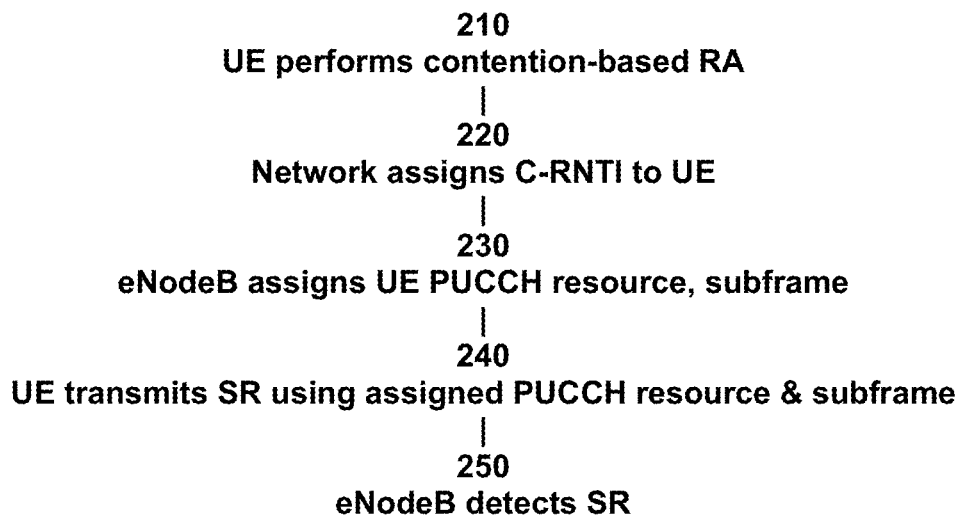
FIG. 6 is a flowchart of the second embodiment of the present invention.

FIG. 6 assumes the case where the eNodeB is assigned PUCCH resources instead of PRACH resource as in the first embodiment.

Thus, as before the UE first performs (step 210) a conventional contention-based RA, leading to assignment of a C-RNTI (step 220). Then (step 230) the eNodeB assigns to the UE a specific resource on PUCCH for its use in transmitting a SR, along with a specific subframe. The UE then transmits its scheduling request to the eNodeB (step 240), using the assigned resource, and within the subframe specified. This is then detected (step 250) by the eNodeB. As before, a SR detected in a subframe not assigned to the corresponding UE is ignored.

This enables use of the other features of the invention described in the applicant's European Patent Application No. 11178027.6, hereby incorporated by reference. In particular these features include the idea of using a "message" (request or indication) from the UE using one of a plurality of pre-configured transmission setups so as to signify that a further UE transmission will follow in a particular resource, for example, use of transmission of SR to indicate a further transmission of PUSCH.

Thus, in one form of the invention in 11178027.6, when a scheduling request is triggered, the UE transmits SR on the first available PUCCH resources for SR, and then PUSCH on the first available resources after the SR transmission. The PUSCH contains BSR, providing the network with early information on UE buffer status. Potential delay can be reduced by not waiting for a PUSCH allocation signalled on the PDCCH. When the network receives the SR it is aware that the UE will also send PUSCH, and requesting any other UEs to send PUSCH which may collide in the same resources can be avoided.

It should be noted that, In the event that the feature of this embodiment is provided in addition to the first embodiment (that is, assignment of a preamble+resource for future RA), it is not essential for the preamble to be a contention-free preamble. The eNodeB could assign to the UE a plurality of preambles, which need not be exclusively and in all resources reserved for use by that UE.

As a variation of this embodiment, the PRACH preamble/ resource of the present invention is an alternative means of realising this "message"; then a particular preamble in a particular resource indicates that another transmission from the UE will follow (e.g. PUSCH, BSR, CSI, SR, SRS). This feature can be applied more than once, in other words to signify that a sequence of transmissions will follow from the terminal. For example when the UE has UL data to send, but no PUSCH (or SR) resources, sequences such as PRACH-SR-PUSCH or PRACH-SR-SRS-PUSCH are possible. Conversely, a different preamble/resource indicates that another transmission will not follow.

Note that European Patent Application No. 11178027.6 is primarily aimed at achieving low latency, while this is not an essential requirement for the current invention. Also, that application does not consider the restriction to the use of particular subframes for particular UEs.

Third Embodiment: Pre-Assigned Expanded Contention-Free RACH

Figure 7:
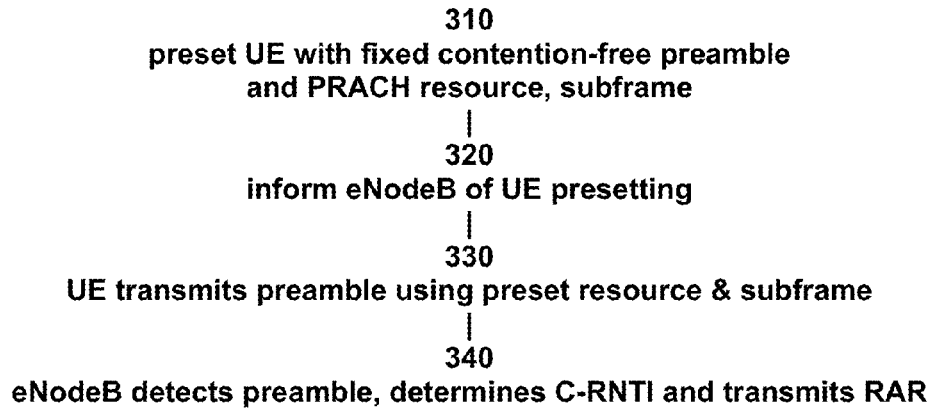
FIG. 7 is a flowchart of the third embodiment of the present invention.

In a third embodiment shown in FIG. 7, the UE is configured with fixed PRACH resources and preamble as described in the first embodiment, and/or dedicated PUCCH resources as described in the second embodiment, by virtue of these parameters being fixed from a certain point in time by means other than an exchange of signalling with the network. This approach would be suitable where a permanent or quasi-permanent assignment is needed. In other words, there is no need in this embodiment for the UE to perform an initial contention-based RA, or for the eNodeB to configure the UE with the PRACH and/or PUCCH resources.

FIG. 7 shows the case in which PRACH resources are pre-configured, by way of example.

Step 310 is a step of presetting the UE with the fixed PRACH resources and preamble. For example, this can be done at the point of installation of the device, by virtue of the installer or manufacturer being able to obtain a list of which such fixed resources have been assigned to other UEs being served by the relevant eNodeB. In step 320, the eNodeB is similarly instructed regarding the insertion and preamble+ resource assignments of the new UE.

Then, during operation of the system, the UE uses the fixed preamble and resource for contention-free RA (step 330). As there is no longer any need for the conventional contention-based RA, the UE can operate with only contention-free RA. The eNodeB detects the preamble and responds with the RA response in the usual way (step 340).

Fourth Embodiment: Release of RA Preambles

In a fourth embodiment (not illustrated), the fixed preambles described in the preceding embodiments are not permanently reserved for or by the UE. As is apparent in the first embodiment, a UE implicitly releases a fixed preamble and any associated PRACH resources when it begins a new contention-based RA procedure. However, in this embodiment, at the same time as signalling the appropriate information in the preceding embodiments, the eNodeB additionally signals a timer to the UE. When this timer expires, the UE is required to perform the process described in the first embodiment, beginning with contention-based RA, on the next occasion it wishes to access PRACH.

Alternatively, the eNodeB can assert a flag at RRC level to indicate to the UE the expiry of its current preamble+ resource assignment. For example, a suitable RRC message (possibly RRCConnectionReconfiguration) can contain a new Information Element which the network would assert when the UE's resources have expired. This approach can also be used to end the quasi-permanent allocation in the third embodiment.

In a variation of this embodiment, timers or flags can be set separately for a UE by the eNodeB for the preamble and/or the time- and, if applicable, frequency-domain resources relevant to the preceding embodiments.

The UE transmits the selected preamble to the eNodeB (step 530), which is then detected by the eNodeB (step 540). In addition to processing the preamble in the usual manner, the eNodeB determines which partition the preamble falls within and from this, infers the information which the UE signified by the chosen partition. Further procedure, such as assignment of a preamble for subsequent (contention-free) RA, may either follow in accordance with the previous embodiments or in the conventional manner. The following embodiments give some examples of usage of this principle.

Fifth Embodiment: UE Category Indication

In a fifth embodiment, a set of preambles is partitioned in a specified way such that the particular partition (or subset of preambles) from which the UE chooses its transmitted preamble(s) indicates to the eNodeB the UE Category. For example, the set of contention-based preambles may be partitioned in this way.

For example, Release 10 of LTE defines the following UE categories based on their maximum peak data rate and MIMO capability:

| 3GPP Release | UE Category | Max. L1 data rate Downlink | Max. no. of DL MIMO layers | Maximum L1 data rate Uplink |
| --- | --- | --- | --- | --- |
| Release 8 | Category 1 | 10.3 Mbits/s | 1 | 5.2 Mbit/s |
| Release 8 | Category 2 | 51.0 Mbits/s | 2 | 25.5 Mbit/s |
| Release 8 | Category 3 | 102.0 Mbits/s | 2 | 51.0 Mbit/s |
| Release 8 | Category 4 | 150.8 Mbits/s | 2 | 51.0 Mbit/s |
| Release 8 | Category 5 | 299.6 Mbits/s | 4 | 75.4 Mbit/s |
| Release 10 | Category 6 | 301.5 Mbits/s | 2 or 4 | 51.0 Mbit/s |
| Release 10 | Category 7 | 301.5 Mbits/s | 2 or 4 | 102.0 Mbit/s |
| Release 10 | Category 8 | 2998.6 Mbits/s | 8 | 1497.8 Mbit/s |

Figure 8:
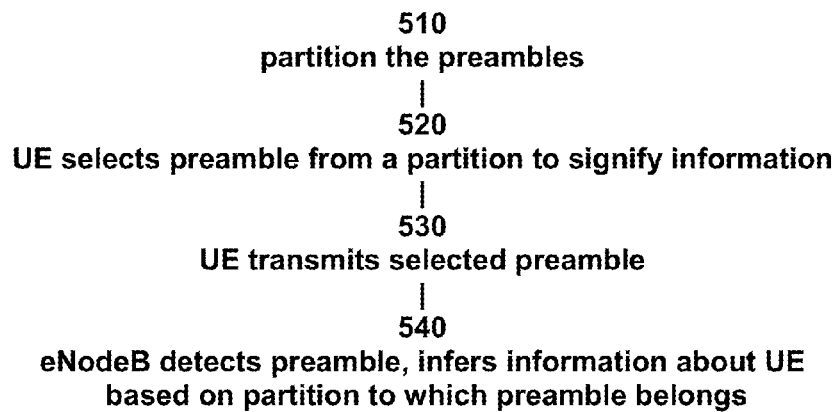
FIG. 8 is a flowchart of fifth to eighth embodiments of the present invention.

The above embodiments relate to the contention-free RA which follows an initial contention-based RA. FIG. 8 shows in simplified form the principle of the fifth to eighth embodiments, all of which employ the idea of partitioning the preambles, such that the UE's choice of preamble signifies to the eNodeB some information pertaining to the UE.

In an initial step 510, the preambles are partitioned in some way, as detailed in the following embodiments. The preambles to be partitioned may include, but do not necessarily include, the contention-based preambles. Not all the available preambles need be included in the partitions; some may be reserved for use by UEs outside the scheme (i.e. without signifying information). Both the eNodeB and the UEs served by the eNodeB are aware of the partitions and their meaning. This step need not be part of routine operation but rather, incorporated into the communication standard or defined at the time of installation of the system. Alternatively, or in addition, the partitions and their significance may be (re)defined during operation.

In step 520, a UE wishing to perform random access, for example contention-based RA, does so by selecting a preamble from those defined to be within a given partition, the partition being chosen (or possibly preset) to signify information relating to the UE, as exemplified in the following embodiments. Optionally, as explained later, a second or further preamble, each in general from a different partition, may be transmitted along with the first preamble. "Along with" need not mean at the same timing but includes, for example, transmission of preambles with a time difference of an integer number of subframes. The eNodeB is able to link preambles having such a fixed timing relationship.

It should be noted that in the above Table, the maximum peak data rate does not imply bandwidth capability, although it has implications for how many resource elements from a given bandwidth may be scheduled for data.

Thus, in Rel-10 there are eight categories which will require eight partitions (or subsets of preambles) to represent each category uniquely. The partitions can contain equal numbers of preambles (8 each), or unequal numbers. To accommodate new categories, such as 'Category 0' to indicate the low-cost devices of the first embodiment, further partitions can be added. An expansion of the number of categories to 16 would be possible whilst still retaining an equal number of preambles in each partition (4 each), although unequal-sized partitions to reflect differing distributions of UE categories can be used.

In a specific case of this embodiment, the set of preambles contains at least a first and a second partition. A UE chooses preambles from the first partition if it is not configured to use the fixed PRACH resource provisioning in the first embodiment, and from the second partition if it is so configured. The eNodeB infers from the partition in which the received preamble falls, whether or not the UE is configured for fixed PRACH resource provisioning. This enables the eNodeB to determine whether or not the technique of the first embodiment, for example (FIG. 5) should be applied to the subsequent RA by the UE.

Sixth Embodiment: UE Bandwidth Capability Indication

As already mentioned the UE category does not imply bandwidth capability of the UE. In fact, presently all UEs are required to support every specified system bandwidth, to ensure that they can connect to any eNodeB (eNodeBs do not necessarily support all system bandwidths). However, it may be desirable in future to allow a UE to signal different bandwidth capabilities (either inherent, or as currently limited by signal processing resources or battery power).

In a sixth embodiment, the set of preambles, for example the contention-based preambles, is partitioned in a specified way such that which partition a UE chooses its preamble(s) from indicates its bandwidth capability. Each LTE bandwidth (1.4, 5, 10, 15, MHz) is assigned to a certain partition of preambles. A maximum of 64 bandwidth capabilities can be indicated, and there are 31 such capabilities in Rel-10 (per carrier). However, signalling on this basis would be likely to significantly increase contention-based RA collisions. In a variation on this embodiment, a UE is able to only signal its preferred bandwidth with each RA procedure. It could signal different bandwidth preferences in separate such procedures. The eNodeB can keep a record of recent bandwidth capability indications from its served UEs to aid scheduling.

In an extension to the invention described in the applicant's International Application PCT/EP2011/067048, hereby incorporated by reference, two (or more) preambles are transmitted so as to jointly indicate bandwidth capability. As before, the choice of partition would signify this information. In this case the partitioning would be among the jointly-transmitted preambles, rather than the individual preambles. The set of joint preambles (64×64) is much larger than the set of individual preambles and can thus more usefully be partitioned for this purpose.

Seventh Embodiment: Buffer Status Report (BSR)

The Buffer Status reporting procedure is used to provide the serving eNodeB with information about the amount of data available for transmission in the uplink buffer(s) of the UE.

In a seventh embodiment, the set of preambles, for example the contention-based preambles is partitioned in a specified way such that which partition a UE chooses its preamble(s) from indicates at least part of the BSR already defined in LTE. This avoids the need to wait for an uplink resource grant for the purpose (via, e.g., SR) and allows the network to quickly assign resources to the UE for UL transmission. As in the fifth embodiment, more of the BSR can be indicated if multiple preambles are used. LTE already allows the UE to indicate the size of the message in step (vi) (Message 3) of the contention-based RA procedure described above, but there are currently only two partitions of contention-based signatures to choose from and they do not explicitly convey information on BSR as opposed to Message 3 of the RA procedure.

Eighth Embodiment: UE Traffic Profile

In an eighth embodiment, the set of preambles, for example the contention-based preambles is partitioned in a specified way such that which partition a UE chooses its preamble(s) from indicates some information about the traffic profile the UE expects to transmit on PUSCH. This can include aspects of: periodicity of traffic, expected size of PUSCH transmissions and requested quality-of-service indications and other relevant matters.

Although the preceding embodiments have concerned the UE signalling information to the eNodeB, it is also possible to apply a similar principle in reverse, in other words for the eNodeB to indicate information about itself (or the network) to the UE. This is the subject of the ninth to eleventh embodiments explained next.

Ninth Embodiment: eNodeB Bandwidth Capability Indication

A ninth embodiment is analogous in concept to the sixth embodiment, except that the set of preambles, or preambles+ grants in the first embodiment is partitioned to indicate to the UE receiving the RA configuration what the bandwidth capability of the eNodeB is. The partitioning can be among the preambles only, or the preambles in conjunction with the time and/or frequency resources, the particular partition indicating the further information (i.e. bandwidth capability in this case). This embodiment is most applicable, but not necessarily exclusively applicable, in response to an initial contention-based RA by the UE.

Figure 9:
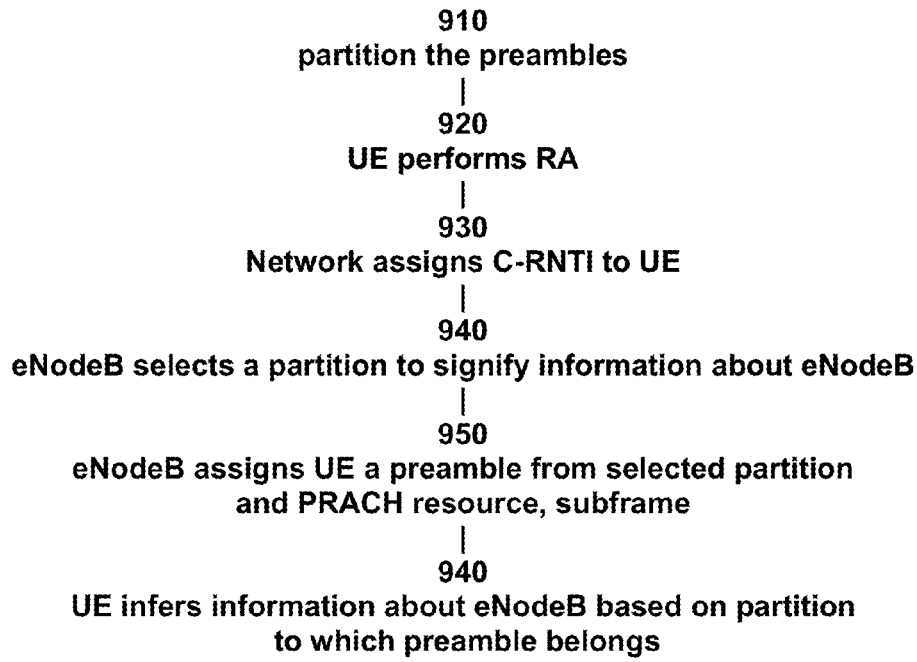
FIG. 9 is a flowchart of the ninth embodiment of the present invention.
Figure 10:
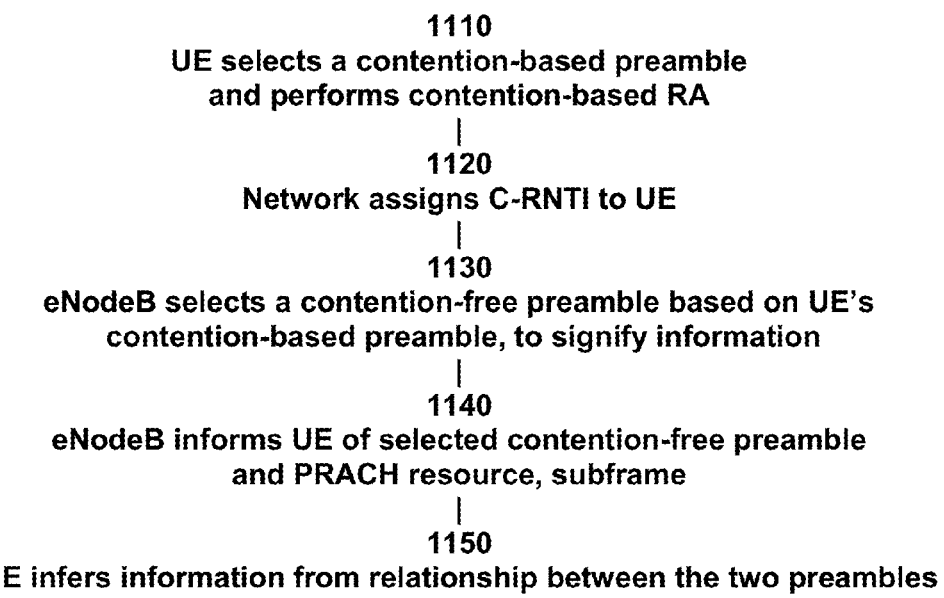
FIG. 10 is a flowchart of the eleventh embodiment of the present invention.

FIG. 9 shows the sequence of steps assuming that only the preambles, rather than preambles+resources, are partitioned.

Thus, in step 910 the preambles are partitioned. The preambles so partitioned will typically be the contention-free preambles. As before the partitioning would generally be determined in advance, with the eNodeB and UEs preconfigured with the partitions.

In step 920, the UE performs a random access procedure such as contention-based RA, either in the conventional manner or by employing one of the fifth to eighth embodiments.

The eNodeB detects the preamble sent by the UE, and the network assigns a C-RNTI to the UE (step 930). Then in step 940, the eNodeB selects a partition such as to signify some information about the eNodeB. The selection need not take place every time. If the information being signified does not change, or changes only rarely, the eNodeB may use the same selection as one determined previously.

From the selected partition, the eNodeB assigns a preamble (for example a contention-free preamble) to the UE, and informs it to the UE along with the resources and subframes to be used for the UE's future RA.

The UE receives this notification (step 940), and as well as recording the assigned preamble/resources for future use, it determines the information about the eNodeB based on the partition to which the preamble belongs.

This principle can be extended to signify other information about the eNodeB apart from bandwidth capability. For example, the partitions may represent for example: TDD/FDD capability, availability of other frequency bands or alternative radio technologies such as UMTS, WiMAX or WiFi Tenth Embodiment: System Information Signalling In a tenth embodiment (not illustrated), parts of the System Information (SI) which are static over time are signalled by partitioning the set of preambles+grants in the first embodiment and providing the UE with a preamble within a selected partition. This can reduce the frequency with which the UE needs to process paging messages from the eNodeB.

The process is otherwise as described in the ninth embodiment and outlined in FIG. 9.

Eleventh Embodiment: Jointly-Selected Contention-Free and Contention-Based Preambles In an eleventh embodiment, information which the eNodeB can indicate statically to the UE such as that in the ninth and tenth embodiments, is indicated by the relationship between the contention-based preamble establishing the C-RNTI and the fixed preamble(+grant) in the first embodiment. This is similar in principle to the invention in the applicant's International Application PCT/EP2011/067048, but here the two preambles are transmitted from distinct nodes and one of them is as in the first embodiment.

Supposing for simplicity that only preambles are considered, the relationship can be quantified, for example, by assigning a numerical index to each possible preamble from 1 to 64. Thus, if the respective indices are denoted by n1 and n2, the difference n1−n2 can be used to signify information. Then, in an initial step 1110, the UE selects a contention-based preamble in the usual way, and a C-RNTI is assigned (step 1120). For the UE's subsequent contention-free RA, the eNodeB selects for the UE a preamble having a certain relationship (e.g., numerical difference in index) such as to signify to the UE the required information. In step 1140, the eNodeB conveys the selected preamble, along with an assigned resource/subframe, to the UE. Then (step 1150) the UE finds the relationship of the newly-assigned preamble to the one it used initially, to determine the required information. For example, the UE may find the numerical difference n1−n2 and look up the result in a look-up table.

Likewise, the relationship between the contention-based preamble establishing the C-RNTI and the fixed contention-free preamble+grant can be defined by a table in which one axis is made up of every possible combination of contention-free preamble+grant.

In the ninth to eleventh embodiments, it is not necessary for all UEs to understand the significance of the partitions or selections employed by the eNodeB. It would be possible for the eNodeB to signal information to suitably-configured UEs in this way whilst continuing to signal the same information by another (slower) procedure used conventionally.

To summarise, embodiments of the present invention may provide a new random access (RA) procedure designed for a scenario where a large number of low-cost and low-capability LTE devices are deployed within a coverage area. After an initial RA procedure, the network assigns the UE fixed PRACH resources in time (and possibly frequency) and a fixed RA preamble for use in future RA procedures. The RA preambles are therefore multiplexed in time, increasing their effective number. The eNodeB maintains a list of UE identity to preamble+resources associations and is thus able to identify which UE is accessing PRACH in a given subframe. To allow a UE to indicate that it is suitable for inclusion in this new procedure, a means of using the RA procedure to transmit information earlier in the access procedure is designed. The set of all permissible preambles is partitioned and each partition is associated with a particular state of the UE with respect to the information it wishes to transmit. In one aspect of the present invention, to indicate its state, the UE chooses a preamble in the initial RA procedure from the relevant partition, rather than at random. In another aspect of the present invention, the eNodeB is able similarly to indicate information to the UE by its choice of preamble+resource in the new RA procedure.

It is to be understood that various changes and/or modifications may be made to the particular embodiments just described without departing from the scope of the claims.

The invention has been described with reference to LTE FDD, but could also be applied for LTE TDD, and to other communications systems such as UMTS and WiMAX. Accordingly, references in the claims to "terminal" are intended to cover any kind of subscriber station, whether fixed or mobile, and are not restricted to the UE of LTE.

In the embodiments discussing partitioning of preambles, there may be some preambles or preambles+resources which are not assigned to any particular indication of the information being indicated. A UE or eNodeB having no need to signal the information discussed in a particular embodiment can choose from among the unassigned preambles or preambles+resources.

The invention does not require any expansion of the number of preambles beyond the 64 currently defined in LTE for example. However, the invention would be equally applicable to future systems designed with an expanded number of preambles whilst following a similar contention-based RACH procedure.

The partitionings discussed can be defined in either or both of relevant specifications and the System Information Blocks (already defined in LTE) with suitable expansion. If included in the specifications, all UEs for which that Release of the specification applies would automatically be aware of the partitions. If included in the SIBs, UEs would only be aware of the partitions if the relevant SIBs are transmitted and contain the partitioning information, and the UE is able to recognize such signalling.

Preferably, all UEs are aware of the partitions so that non-participating UEs do not unintentionally signal information to the eNodeB. However, it would also be possible to allow non-participating UEs to choose preambles being used for the invention and for the eNodeB to identify such cases later, for example by additional signalling.

Conventionally, a "contention-free preamble" is a single preamble reserved for use by a specific UE. In embodiments of the present invention it may be desirable to allow a UE to transmit more than one preamble, or more than one preamble+resource. In such cases, the eNodeB may reserve multiple preambles for a given UE. Moreover, it need not necessarily be the case that a reserved preamble is always available for use exclusively by a given UE. The expression "contention-free preamble" is thus to be interpreted broadly.

Any of the aspects, embodiments and variations mentioned above may be combined in the same system. In the seventh and eighth embodiments, the information being signified to the eNodeB is dynamically changing, in contrast to the static or slowly-varying information being conveyed in the fifth and sixth embodiments for example. It would however be possible to combine such embodiments, by applying the feature of transmitting a second or further preamble as in the sixth embodiment.

In any of the aspects or embodiments of the invention described above, the various features may be implemented in hardware, or as software modules running on one or more processors. Features of one embodiment may be applied to any of the other embodiments.

Although various references have been made above to actions performed at an eNodeB, at least some such actions may actually be controlled at a higher level in the network and notified to the eNodeB.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

INDUSTRIAL APPLICABILITY

The invention designs an RA procedure that takes advantage of the low-rate, low-power and relatively static deployment scenarios relevant to dense MTC-enabled devices. This reduces contention on PRACH, thus saving power, and allows efficient allocation of PRACH resources given the traffic profiles likely with such devices. By further designing a way of transmitting more information as part of the RA procedure, it makes improved use of the transmit power and resources that are used, and provides the eNodeB with early information on the classes and requirements of the UEs it must serve. This is achieved without the significant additional complexity that would result from simply increasing the number of preambles available. The advantages over using SR (scheduling request) are that SR requires UL timing to be already established.

What is claimed is:

1. A transmission method for use in a communication system comprising a base station and one or more terminals, the method involving the base station transmitting a signal to a terminal, and providing the terminal with resource allocations specific to the terminal for transmitting a further signal from the terminal to the base station, said resource allocations allocating to the terminal:
   one or more locations for transmission of the further signal in the time domain including one or more subframes within which transmission of the further signal is permitted; and wherein
   transmission of the further signal from the terminal, in a resource selected by the terminal from the resource allocations, indicates further information relating to the terminal.

2. The method according to claim 1, wherein providing the terminal with said resource allocations of the further signal comprises the base station transmitting said resource allocations by means of said signal to the terminal.

3. The method according to claim 1, wherein the further signal comprises a preamble for transmission in a random access procedure.

4. The method according to claim 3, wherein said resource allocations further include a preamble to be used by the terminal.

5. The method according to claim 1 wherein the further signal comprises a scheduling request, said resource allocations including characteristics of resources to be used for the scheduling request.

6. The method according to claim 1 wherein providing the terminal with resource allocations of the further signal provides the resource allocations by means of a procedure performed independently of the base station.

7. The method according to claim 1 wherein said resource allocations apply to the terminal for a limited time.

8. The method according to claim 3, wherein a set of possible preambles is defined in the system and divided into two or more partitions, the transmission of the preamble from the terminal indicating said further information relating to the terminal by virtue of the partition to which the preamble belongs.

9. The method according to claim 8 wherein said further information relating to the terminal includes at least one of:
   category of the terminal;
   bandwidth capability of the terminal;
   buffer status of the terminal; and
   traffic profile expected by the terminal.

10. A transmission method for use in a wireless communication system comprising a base station and one or more terminals wherein the base station transmits a signal to a terminal which indicates to the terminal resource allocations specific to the terminal for transmission of a further signal from the terminal to the base station, wherein said resource allocations allocate to the terminal at least one of:
    one or more locations for transmission of the further signal in the frequency domain; and
    one or more locations for the transmission of the further signal in the time domain;
    wherein said resource allocations indicate to the terminal further information relating to the base station or system.

11. The method according to claim 10, wherein:
    the further signal comprises a preamble for transmission in a random access procedure and said resource allocations further include a preamble to be used by the terminal;
    a set of possible preambles is defined in the system and divided into two or more partitions, the transmission of the signal from the base station to the terminal indicating said further information relating to the base station or system by virtue of the partition to which the preamble, to be used by the terminal, belongs.

12. The method according to claim 11 wherein said further information relating to the base station or system comprises at least one of:
    a bandwidth capability indication of the base station;
    system information;
    TDD/FDD capability of the base station; and
    availability of other frequency bands or alternative radio technologies.

13. The method according to claim 11 wherein said random access procedure comprises a contention-based random access followed by a contention-free random access, said further information relating to the base station or system being indicated by a combination of characteristics of a preamble transmitted from the terminal for contention-based random access and the resource allocations of said further signal as provided by the base station, said further signal being a preamble for contention-free random access.

14. A wireless communication system comprising a base station and one or more terminals, wherein:
    the base station is arranged to transmit a signal to a terminal, and to provide the terminal with resource allocations specific to the terminal of a further signal for transmission from the terminal to the base station, said resource allocations allocating to the terminal:
    one or more locations for transmission of the further signal in the time domain including one or more subframes within which transmission of the further signal is permitted; and wherein
    the terminal is arranged to transmit the further signal in a resource selected by the terminal from the resource allocations, the selection indicating further information relating to the terminal.

15. One or more non-transitive computer-readable recording media storing computer-readable instructions which, when executed by a processor of a terminal in a wireless communication system configure the terminal to:
    receive a signal from a base station;
    receive resource allocations specific to the terminal for transmitting a further signal to the base station, said resource allocations allocating to the terminal one or more locations for transmission of the further signal in the time domain including one or more subframes within which transmission of the further signal is permitted;

select a resource from the resource allocations to indicate further information relating to the terminal; and transmit the further signal from the terminal in the resource selected.

16. One or more non-transitive computer-readable recording media storing computer-readable instructions which, when executed by a processor of a base station in a wireless communication system configure the base station to:
- transmit a signal to a terminal which indicates to the terminal resource allocations specific to the terminal for transmission of a further signal from the terminal to the base station, wherein said resource allocations allocate to the terminal at least one of:
  - one or more locations for transmission of the further signal in the frequency domain; and
  - one or more locations for the transmission of the further signal in the time domain; and
- wherein said resource allocations indicate to the terminal further information relating to the base station or the system.

17. The method according to claim 1 wherein the resource allocations further include one or more locations in the frequency domain for transmission of the further signal.

* * * * *